INVENTORS.
JEROME CORWIN
SAMUEL ADLER
BY Lawrence Glassman
ATTORNEY

Patented Apr. 14, 1953

2,635,217

UNITED STATES PATENT OFFICE 2,635,217

SYNCHRO DATA SWITCHING CIRCUIT

Jerome Corwin, Long Branch, and Samuel Adler, Asbury Park, N. J., assignors to the United States of America as represented by the Secretary of the Army Application March 5, 1951, Serial No. 213,997

4 Claims. (Cl. 318—30)

(Granted under Title 35, U. S. Code (1952), sec. 266)

The invention described herein may be manufactured and used by or for the Government for governmental purposes, without the payment of any royalty thereon.

This invention relates to synchro data transmission systems and more particularly to a synchro data switching circuit having means for differentiating between true and false null voltage positions.

In synchro data transmission systems employing a plurality of synchro data transmitting units, it is desirable to sample the output data of any one of the transmitting synchro units by means of a single data receiver unit when the angular difference between any one of the transmitters and the receiver is less than two degrees. However, one serious limitation to the use of such a multi-synchro sampling system is the ambiguity introduced by the occurrence of null voltages at both zero and 180-degree displacement of the respective transmitter rotors. While at present the most important applications of our invention are in connection with synchro data transmission systems, it is to be understood, of course, that the invention is not limited thereto.

It is therefore an object of this invention to provide a switching circuit which eliminates the ambiguity factor.

It is another object of this invention to eliminate the ambiguity factor by providing a switching circuit which is responsive to two synchro voltages having amplitude envelopes displaced 90 degrees with respect to each other.

It is a specific object of the invention to provide a switching circuit which differentiates between the two null voltage positions of a synchro transmitter.

A synchro data switching circuit for eliminating the ambiguity introduced by the two null voltage positions of a synchro transmitter in accordance with the present invention comprises a synchro differential generator which is electrically coupled to the synchro output voltage from the three-phase windings of a selected synchro transmitter and means for converting the three-phase synchro voltage outputs to two synchro voltages having amplitude envelopes displaced 90 degrees relative to each other. The amplitude level of one of these voltages is utilized for switching when the angular difference between the rotor of the synchro differential generator and the rotor of the synchro transmitter is electrically within two degrees of the true zero position. The phase of the other synchro voltage is used to differentiate between the zero and the 180-degree positions by having its phase compared to that of a reference voltage which is the synchro excitation voltage. The term "synchro voltage" designates an alternating current voltage having the same frequency and peak values as the reference voltage and may be either in phase or 180 degrees out-of-phase with said reference voltage.

For a better understanding of the invention together with other and further objects thereof, reference is had to the following description taken in connection with the accompanying drawings in which.

Figure 1:
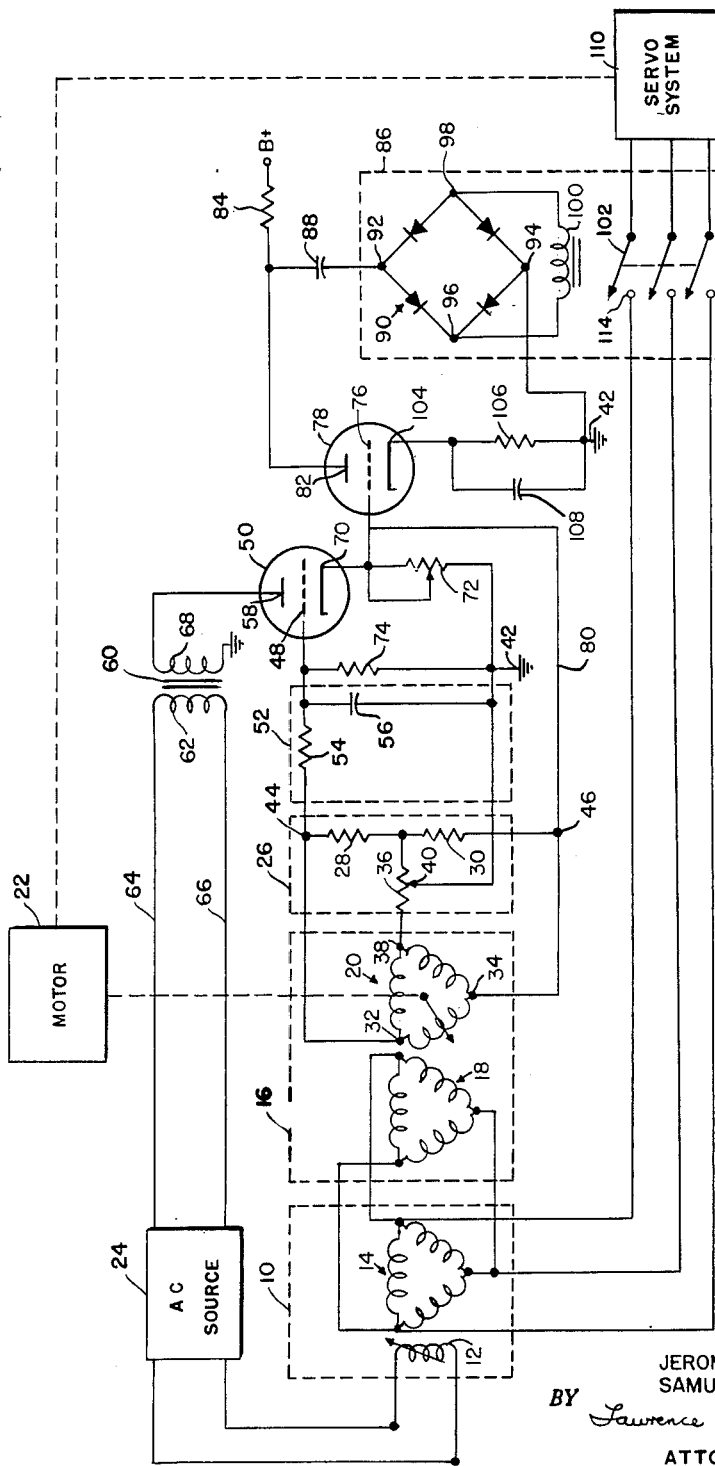
Fig. 1 is a circuit diagram illustrating our invention.

Referring now to Fig. 1, there is shown a synchro data transmitter 10 having a single-phase rotor winding 12 and a three-phase stator winding 14 of conventional design. Electrically coupled to transmitter stator 14 is a conventional synchro differential generator 16 which includes a three-phase stator winding 18 and a three-phase rotor winding 20. As shown, corresponding windings of the respective stators are connected together. Rotor 20 may be rotatably driven from an indexed position in a prescribed direction and at a predetermined speed by means of a motor 22. To provide synchro excitation voltage, or reference voltage, for both the synchro transmitter and its associated synchro differential generator, a suitable A.-C. source 24 is applied across the terminals of rotor winding 12. If more than one synchro transmitter is used, there will be a corresponding differential synchro provided for each synchro transmitter, all the rotors of the differential synchros being mounted on a single shaft which is diven by motor 22.

Figure 2:
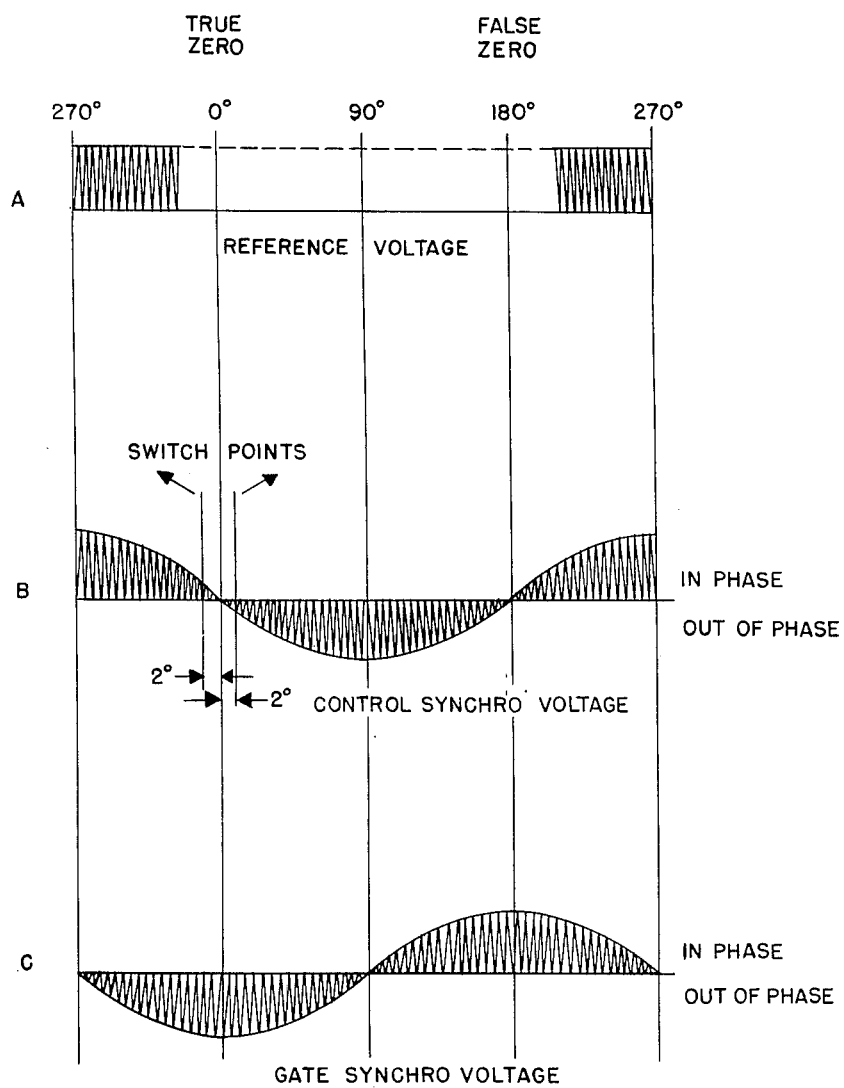
Fig. 2 shows a series of graphs utilized in explaining the operation of our invention.
Figure 3:
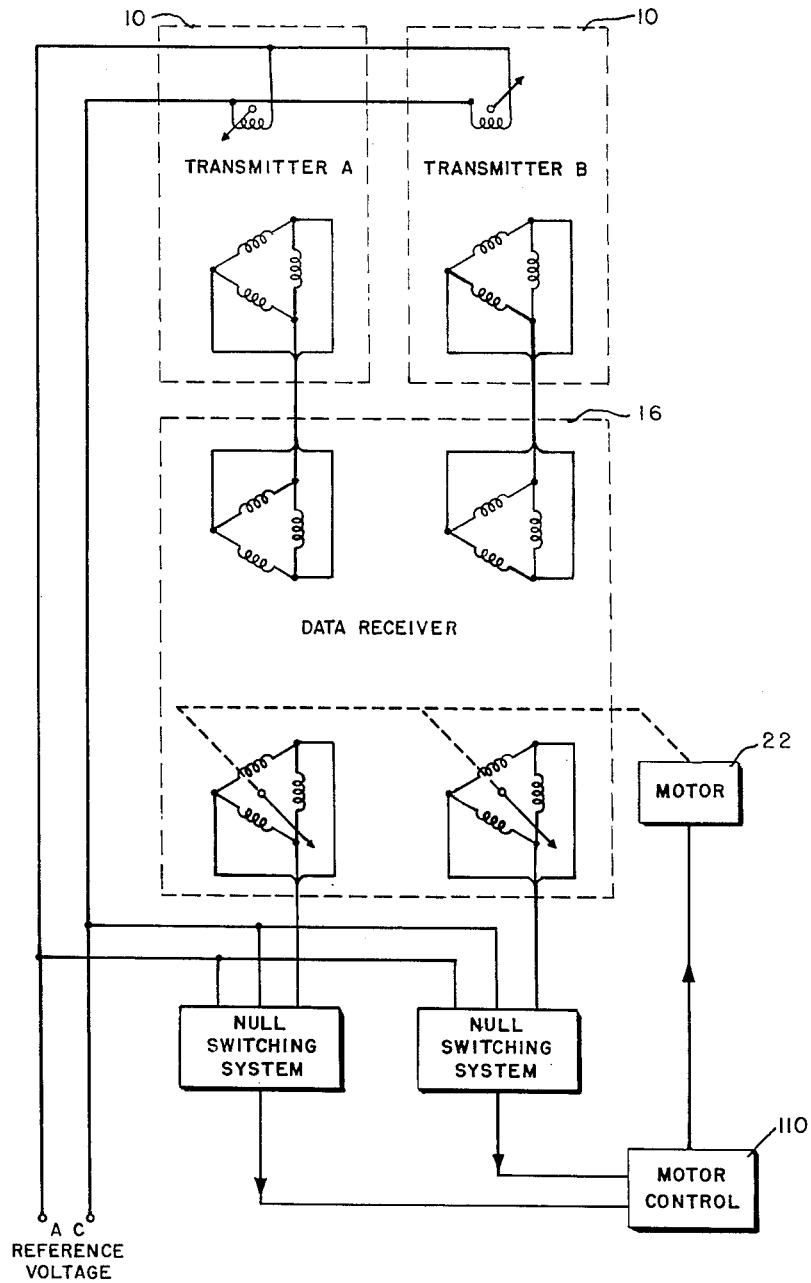
Fig. 3 is a block circuit diagram illustrating the present invention in a synchro sampling system employing two discrete transmitters and a null switching system for each transmitter.

Connected across the output terminals of differential rotor winding 20 is a Scott-T type resistor network 26 which converts the synchro voltage output of the three differential rotor windings to two synchro voltages having amplitude envelopes displaced 90 degrees with respect to each other as illustrated by curves B and C of Fig. 2. Scott-T resistor network 26 is of conventional design and is well known in the art. It includes resistors 28 and 30 connected in electrical series arrangement between terminals 32 and 34 of differential rotor 20, and a potentiometer 36 connected between terminal 38 of said rotor and the junction of the serially connected resistors. The center contact arm 40 of potentiometer 36, which may be adjusted for accurate 90 degree displacement, is grounded as at 42. By this arrangement, one of the displaced synchro voltages is developed across resistor 28 and the other of said displaced synchro voltages is developed across resistor 30. Output terminals 44 and 46 are provided at opposite ends of the serially connected resistors 28 and 30. For convenience, the synchro voltage outputs from terminals 44 and 46 will hereinafter be respectively designated as the gate synchro voltage and control synchro voltage, the choice of which voltage is gate and which is control being pure arbitrary. It is to be understood, of course, that other suitable means may be used to convert the synchro voltage outputs of the three-phase differential rotor windings to two synchro voltages having amplitude envelopes displaced 90 degrees.

The gate synchro voltage output from output terminal 44 is coupled to control grid 48 of tube 50, hereinafter designated as the gate tube, through a conventional phase shifting network 52. Said phase shifting network is provided to compensate for the electrical phase shift of the gate synchro voltage with respect to the reference voltage caused by the inherent electrical characteristics of the synchro transmitter, differential synchro generator, and the Scott-T resistor network. As shown, phase shifting network 52 includes a resistor 54 connected between grid 48 and terminal 44, and a capacitor 56 which is connected between said grid and ground. Of course, the amount of resistance and capacitance required depends upon the degree of the electrical phase shift.

The alternating current reference voltage from source 24 is applied to plate 58 of gate tube 50 by means of transformer 60 which includes a primary winding 62 and a secondary winding 68. As illustrated, the terminals of primary winding 62 are connected across A.-C. source 24 through leads 64 and 66. One end of transformer secondary winding 68 is connected to plate 58 and the other end of said secondary winding is connected to ground. Cathode 70 of gate tube 50 is connected to ground through variable cathode resistor 72. A conventional grid leak resistor 74 is connected between control grid 48 and ground.

The control synchro voltage from output terminal 46 is applied to grid 76 of tube 78, hereinafter designated as the control tube, through lead 80. Grid 76 is also connected to cathode 70 of gate tube 50. Thus, control tube grid 76 may have two input voltages simultaneously applied thereto. One of these may be developed across gate cathode resistor 72 to supply a positive bias, and the other is the control synchro voltage from terminal 46. A D.-C. potential, B+, which may be supplied by any suitable source, is applied to plate 82 of control tube 78 through plate load resistor 84. A switching relay circuit 86 is coupled to plate 82 by means of coupling capacitor 88. Relay circuit 86 includes a rectifier 90, which may be of the dry disc rectifier type, connected in the full-wave bridge circuit consisting of four rectifier units. The input terminals 92 and 94 of said rectifier are connected, respectively, between one plate of coupling capacitor 88 and ground. Thus, rectifier 90 is effectively connected in the alternating current plate circuit of tube 78. Connected across the output terminals 96 and 98 of rectifier 90 is a direct current relay coil 100 which activates switch arm 102. Cathode 104 of control tube 78 is connected to ground through cathode biasing resistor 106. Connected across resistor 106 is alternating current by-pass capacitor 108.

Ganged switch arm 102 is coupled to a utilization circuit 110 which may be any suitable servo system well known in the art. In the embodiment illustrated, contact terminal 114 is shown as being connected to the output of synchro transmitter stator winding 14. Thus, only when synchro transmitter data may be transmitted to the utilization circuit for sampling switch arm 102 makes contact with terminal 114. If desired, the output of the synchro data transmitter may be applied to the motor 26, through contact 114 and switch arm 102, to a synchro control transformer and servo amplifier thus causing the motor to slave the synchro transmitter.

In considering the operation of the described invention, it is to be assumed that transmitter rotor 12 is in a predetermined angular position and that differential rotor 20 is rotatably driven in a prescribed direction. It is also to be assumed that when relay coil 100 is energized, switch arm 102 is open. Thus, switching may occur only when relay coil 100 is deenergized. It is further to be assumed that the total grid bias on control tube 78 is such that said tube will not be responsive to applied control synchro voltages which are below a predetermined amplitude level, for example, two volts. This predetermined level may, for example, occur when differential rotor 20 is ±2 electrical degrees of the "true zero" position.

Fig. 2 illustrates the angular relationship between the phase and amplitude of corresponding synchro voltages for one revolution of the differential rotor 20 in respect to transmitter rotor 12. Curves A, B and C respectively represent the reference voltage, the control synchro voltage, and the gate synchro voltage. As mentioned hereinabove, the amplitude envelopes of the gate and control synchro voltages, curves B and C, are displaced 90 degrees with respect to each other.

The synchro voltages illustrated in curves B and C are identical in amplitude and form and may be either in phase or 180 degrees out-of-phase with the reference voltage. In order to differentiate between in phase and out-of-phase voltages with respect to the reference voltage, in phase voltages may be represented above a horizontal base and out-of-phase voltages may be represented below the base line. Thus, in curves A, B and C, the synchro voltages above the horizontal base line are designated "in phase" and the synchro voltages below the horizontal base line are designated "out-of-phase."

It is apparent, that as the synchro differential rotor is rotatably driven, two null voltage positions may occur. One null voltage position occurs when differential rotor 20 is electrically in the same relative position with its associated stator 18 as transmitter rotor 12 is with its associated stators 14. This represents the "true zero" position and is indicated in Fig. 2 at 0°. The other null voltage position, which occurs 180 degrees from the "true zero," represents the "false zero" position. Switching is desired for only the "true zero" position. It can be seen from curves B and C that at the "true zero" position the gate synchro voltage has maximum amplitude and is 180 electrical degrees out-of-phase with the reference voltage, while at the "false zero" position the gate synchro voltage again has maximum amplitude but it is now in phase with the reference voltage.

The gate synchro voltage is fed to gate control grid 48 after the proper amount of electrical phase shift, and the reference voltage is fed to plate 58 through transformer 68. When the gate voltage is in phase with the reference voltage, it is rendered conductive, thus supplying positive bias voltage to control tube grid 76 by current flow through gate tube cathode resistor 72. The positive cathode output voltage from gate tube 58 and the control synchro voltage are applied simultaneously to control tube grid 76. The positive voltage developed across gate cathode resistor 72 is supplied to control tube grid 76 only when gate tube 58 is conducting. When gate tube 58 is thus rendered conductive, the output voltage from cathode resistor 72 is sufficient to overcome the grid bias on control tube 78 and tube 78 is then responsive only to amplitude levels of the gate synchro voltage. It can readily be seen that this condition exists only when the differential rotor is substantially at the "false zero" or 180-degree position. During this period, the gate synchro voltage is coupled to rectifier 90 and relay coil 100 remains energized. Hence no switching occurs during this period.

When gate tube 58 is not operating then no voltage is developed across cathode resistor 72. Because of the direct current cathode bias across control cathode resistor 106, control tube 78 is then responsive only to amplitude levels of the control synchro voltage which are above 2 volts. When differential rotor 20 is substantially at the electrical "true zero" position, gate tube 58 is inoperative inasmuch as the reference voltage applied to plate 58 is now out-of-phase with the gate synchro voltage applied to gate tube grid 48 from Scott-T network 26. As long as the control synchro voltage amplitude level is greater than 2 volts, coil relay 100 will be energized. However, when the amplitude level falls below two volts, for example, at ±2 degrees of the "true zero" position, switching relay 86 is unresponsive to the control synchro voltage and coil 100 is de-energized. Hence switching occurs at this point which is the "true zero."

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In combination with a synchro transmitter having its rotor positioned in a prescribed angular position and a synchro differential generator operatively associated therewith, said synchro differential generator having a three-phase rotor winding; a reference voltage for exciting said synchro transmitter rotor; means for converting the output of said three-phase rotor winding to two discrete synchro voltages having amplitude envelopes displaced 90 degrees relative to each other; means for rotating said differential rotor in a prescribed direction; means responsive to one of said synchro voltages and said reference voltage for differentiating between zero and 180-degree null voltage positions of said differential rotor in relation to the prescribed angular position of the synchro transmitter rotor; and means responsive to the other of said synchro voltages for utilizing the output voltage of said synchro transmitter when said differential rotor is substantially at said zero null voltage position.

2. In combination, a synchro transmitter having its rotor in a prescribed angular position; a reference voltage for exciting said rotor; a synchro differential generator operatively associated with said synchro transmitter, said differential generator having a three-phase rotor winding; means for converting the output of said three-phase rotor winding to first and second discrete synchro voltages having amplitude envelopes displaced 90 degrees relative to each other; means for rotating said differential rotor in a prescribed direction; a first vacuum tube having at least a plate, grid and cathode; means for applying said reference voltage to said plate; means for applying said first synchro voltage to said grid, said first synchro voltage being in phase with said reference voltage when said differential rotor is in the 180-degree null voltage position in relation to said transmitter rotor and out-of-phase with said reference voltage when said differential rotor is in the zero null voltage position in relation to said transmitter rotor, said first tube being rendered conductive when said first synchro voltage is in phase with said reference voltage and nonconductive when said first synchro voltage is out-of-phase with said reference voltage; a resistor in series with said cathode for producing an output voltage when said first tube is conducting; a second vacuum tube having at least a plate, a grid and a cathode and responsive to said output voltage and said second synchro voltage; bias means in circuit with the cathode of said second tube for rendering said second tube unresponsive to second synchro voltages below a predetermined amplitude level when said differential rotor is substantially at the zero null voltage position; and means coupled to the plate of said second tube for utilizing the output of said synchro transmitter when said differential rotor is substantially at the zero null voltage position.

3. The device as set forth in claim 2 wherein said last mentioned means comprises a full-wave rectifier having input and output terminals; a coupling capacitor connected between one of said input terminals and the plate of said second tube; and a relay coil connected across the output terminals of said rectifier.

4. In combination, a synchro transmitter having its rotor in a prescribed angular position; a reference voltage for exciting said rotor; a synchro differential generator operatively associated with said synchro transmitter, said differential generator having a three-phase rotor winding; means for rotating said differential rotor in a prescribed direction; means for converting the output of said three-phase rotor winding to first and second discrete synchro voltages having amplitude envelopes displaced 90 degrees relative to each other, said first synchro voltage being in phase with said reference voltage when said differential rotor is in the 180-degree null voltage position in relation to said transmitter rotor and out-of-phase with said reference voltage when said differential rotor is in the zero null voltage position in relation to said transmitting rotor; means for differentiating between said zero and 180-degree null voltage positions, said differentiating means comprising a first vacuum tube having an input circuit and an output circuit and responsive to the relative phase of the first synchro voltage with respect to said reference voltage, said first tube being rendered conductive only when said first synchro voltage and said reference voltage are in phase; a second vacuum tube having an input circuit and an output circuit, the input circuit of said second tube being coupled to the other of said synchro voltages and the output circuit of said first vacuum tube; and means in circuit with the output circuit of said second tube for utilizing the output voltage of said synchro transmitter when said differential rotor is substantially at said zero null voltage position.

JEROME CORWIN.
SAMUEL ADLER.

References Cited in the file of this patent
UNITED STATES PATENTS

| Number    | Name    | Date          |
|-----------|---------|---------------|
| 1,985,982 | Edwards | Jan. 1, 1935  |
| 2,453,815 | Rodeman | Nov. 16, 1948 |
| 2,511,863 | McCoy   | June 20, 1950 |